Jan. 8, 1952    J. H. TALMAGE ET AL    2,581,730
FILING APPLIANCE
Filed March 2, 1946    5 Sheets-Sheet 1
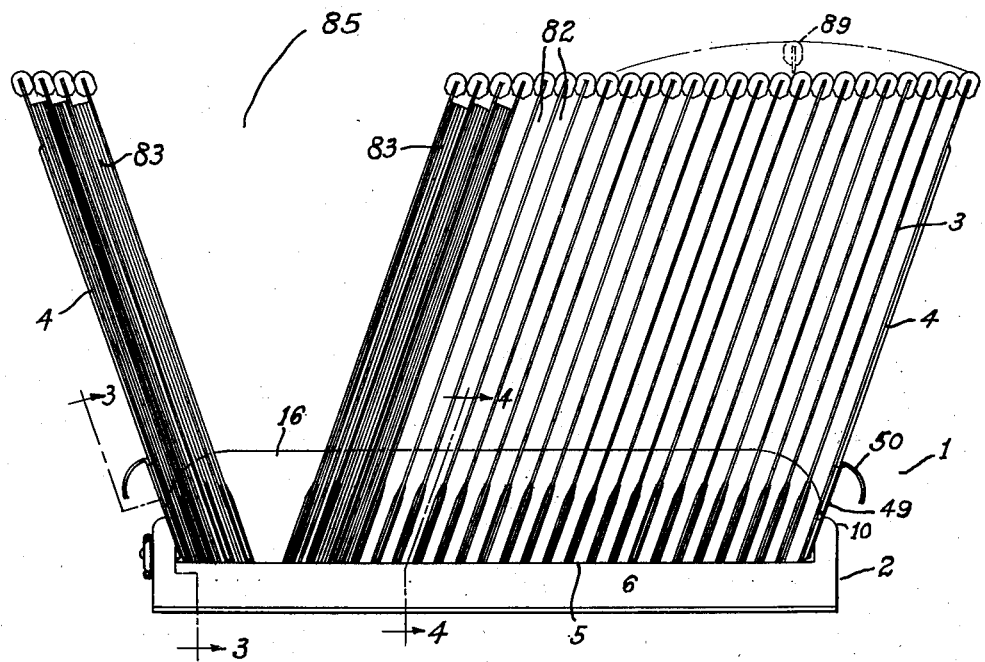
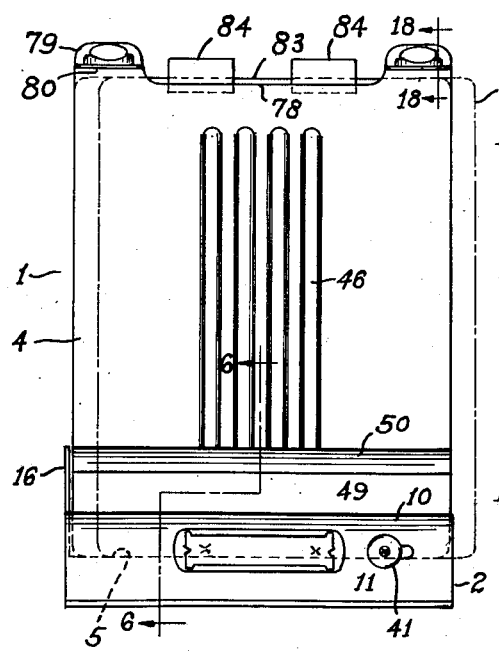
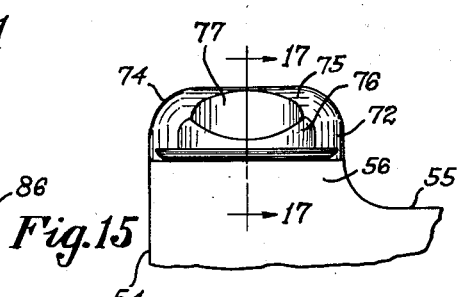
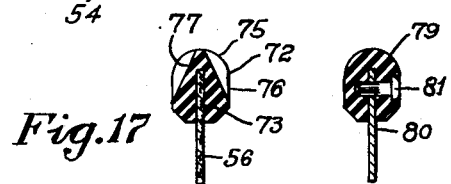
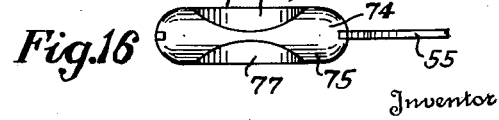
Inventor
John H. Talmage and
Robert W. Finley
By Frease and Bishop
Attorneys Inventor
John H. Talmage and
Robert W. Finley
By Frease and Bishop
Attorneys Jan. 8, 1952 J. H. TALMAGE ET AL 2,581,730
FILING APPLIANCE
Filed March 2, 1946 5 Sheets-Sheet 3

Inventor
John H. Talmage and
Robert W. Finley
By Frease and Bishop
Attorneys

Jan. 8, 1952     J. H. TALMAGE ET AL     2,581,730
FILING APPLIANCE
Filed March 2, 1946     5 Sheets-Sheet 4
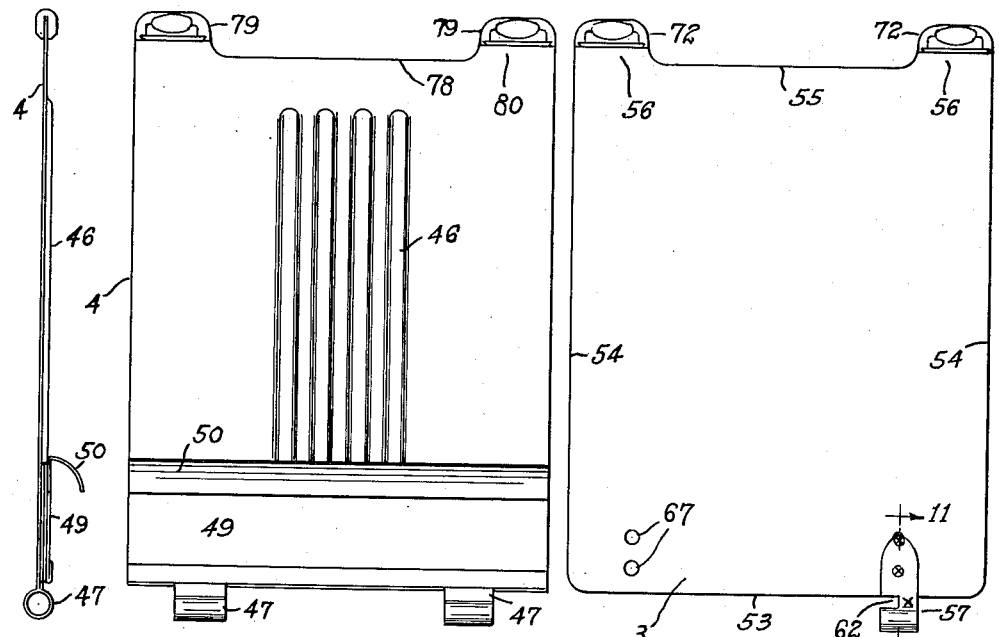
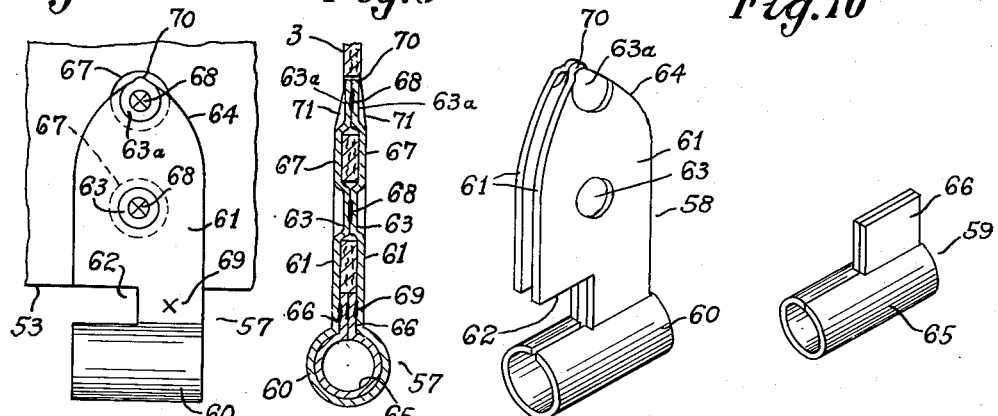
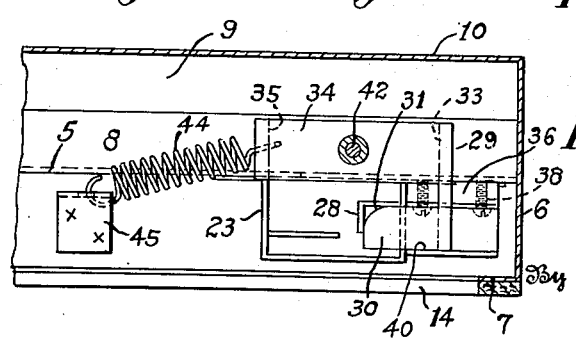
Inventor
John H. Talmage and
Robert W. Finley

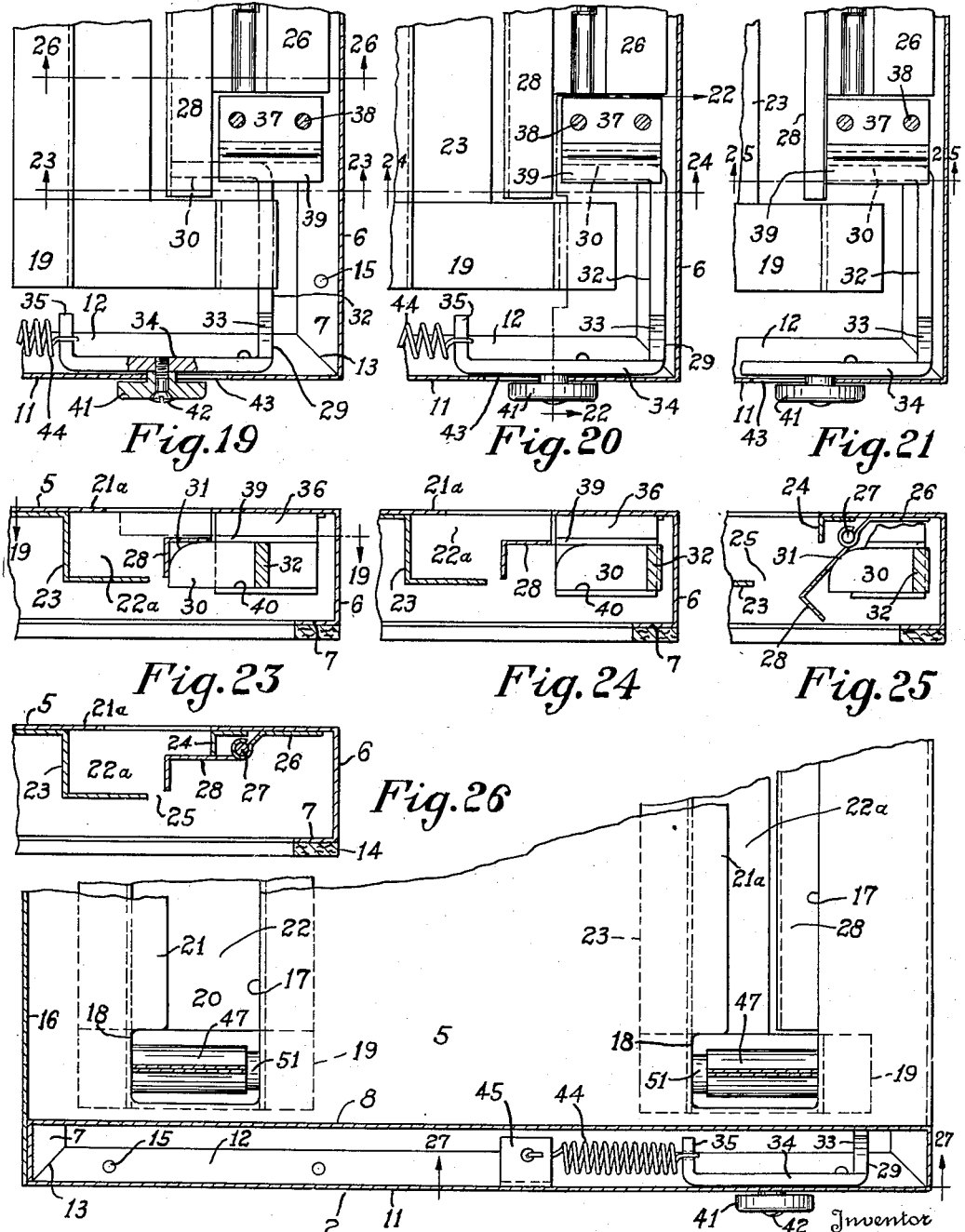

Patented Jan. 8, 1952

2,581,730

UNITED STATES PATENT OFFICE 2,581,730

FILING APPLIANCE

John H. Talmage and Robert W. Finley, Canton, Ohio, assignors to Diebold, Incorporated, Canton, Ohio, a corporation of Ohio Application March 2, 1946, Serial No. 651,564

3 Claims. (Cl. 129—15)

The invention relates to filing appliances and more particularly to tray or housing equipment for filing records of various sizes and kinds, printed, typed, photographed, recorded, or otherwise entered upon cards, sheets, forms, negatives, prints, records and the like, of almost any thickness from light weight bond or ledger papers to heavy index bristol board and cardboard and including photographic positives and negatives and sound recording records. Such record cards and the like may include tabulating cards, machine posted record sheets, statements, ledger records, stock records, sales records, negative films, photoprints, record recordings, and the like.

Innumerable types and kinds of record housing equipment have been made and used for filing record sheets, cards, and forms but each has involved difficulties and disadvantages in use. Thus, prior filing appliances for handling machine-posted records are not compact and conveniently arranged and they usually involve compressors, angle plates, followers, binding posts, straps or other mechanical devices which must be adjusted or operated in working on, using or removing records housed therein. Also, the use of prior record housing equipment in connection with posting machines involves a number of operations for arranging the material for posting and further operations after posting procedures have been completed.

Moreover, prior devices have considerable waste space for a given size of equipment, thus decreasing the record housing capacity thereof.

Furthermore, prior devices prevent easy finger tip operation of the records therein, prevent rapid riffling or blading or stuffing or offsetting of the housed records, and impede satisfactory guiding, indexing and visibility of the records therein.

These difficulties and disadvantages involve waste motion by the operator, resulting in slowing down machine posting operations and operator output, and causing considerable fatigue to the operator.

Furthermore, in some prior filing devices sagging or curling of the record sheets or cards filed therein occurs; and the appliance must be held open at the place of use to prevent falling over or collapse of adjacent records.

Likewise, in prior filing appliances, it has been difficult to expand or contract the number of housed records and to rearrange the record cards therein.

It is therefore an object of the present invention to provide a new portable record card filing appliance which is compact in construction and flexible and convenient to use.

Furthermore, it is an object of the present invention to provide a new portable record card filing appliance which eliminates compressors, followers, binding posts, straps, and other similar mechanical attachments, thereby providing a greater record housing capacity.

Also, it is an object of the present invention to provide an improved portable record card filing appliance which is quick and easy to use and provides for increased machine and operator output, thereby speeding work, eliminating waste motions and reducing operator fatigue.

Moreover, it is an object of the present invention to provide an improved portable record card filing appliance which eliminates mechanical adjustments or operations prior to and following the carrying out of posting procedures on a posting machine.

Also, it is an object of the present invention to provide an improved portable record card filing appliance in which the records housed therein may be readily guided or indexed, easily riffled or bladed, instantly offset and positively and accurately aligned, and at all times subject to instant finger tip operation or control.

Furthermore, it is an object of the present invention to provide a new portable record card filing appliance which will handle records for any make or style of posting machine, or records of any size of say 6" to 17" wide and say 3" to 14" high, which does not require the record cards handled or housed to be punched for filing but yet readily handles record cards which previously have been punched, and which accommodates record cards made of any weight of bond or ledger or index bristol paper, cardboard and the like.

Moreover, it is an object of the present invention to provide a new portable record card filing appliance which prevents sagging or curling of the record cards filed therein and wear or damage to the bottom edges of such record cards.

Likewise, it is an object of the present invention to provide an improved portable record card filing appliance in which multiple, locked-in, uniformly spaced separators are utilized which protect the record cards and form individual compartments for selected groups of record cards and which may be readily removed, replaced or rearranged without disturbing adjacent record cards.

Also, it is an object of the present invention to provide an improved portable record card filing appliance in which the number of records housed therein may be substantially instantly expanded or contracted in a very simple manner without disturbing other records housed therein.

In addition, it is an object of the present invention to provide an improved portable record card filing appliance which may be readily opened to expose any record card therein substantially instantaneously so as to form a deep, wide, V-opening providing ample visibility of the entire face of the record card exposed, and supporting the exposed record card in flat upstanding angled position, and likewise supporting in flat upstanding forwardly angled position all record cards in the appliance forward of the particular card exposed, and also supporting in flat upstanding rearwardly angled position all other record cards in the appliance at the rear of the particular card exposed.

Also, it is an object of the present invention to provide a new portable record card filing tray having a base formed with stops at each end and with a high side and an opposite open side so as to permit selective offsetting or rapid alignment of the records housed therein.

Furthermore, it is an object of the present invention to provide an improved portable record card filing tray with a base and having spaced pivotally mounted upstanding separators positively locked to the base, each of which separators selectively may be removed by a simple manual operation of the lock.

In addition, it is an object of the present invention to provide an improved portable record card filing tray with a base and having spaced record card supporting separators and improved end members providing handles for the tray and cooperating with the base to provide end stops to form a selected V-opening between any two adjacent separators for exposing a desired record card.

Moreover, it is an object of the present invention to provide an improved record card filing tray with a base and having spaced multiple separators and end covers all pivotally mounted on a base on axes located in the same horizontal plane.

Likewise, it is an object of the present invention to provide an improved portable record card filing tray with a base and having spaced pivotally mounted separators, with improved means for attaching pivot mountings to preferably cardboard separators at their bottom edges so that the pivot mountings will not tear or damage record cards when being removed from or replaced in the tray.

Furthermore, it is an object of the present invention to provide an improved pivot mounting for the separators of a portable record card filing tray in which the pivot mountings may be formed of very light gauge sheet metal and reinforced against distortion from a truly round shape.

Also, it is an object of the present invention to provide an improved construction of thumb knobs for the separators of portable record card filing trays which provide for instant access to any desired record card housed in the tray.

Moreover, it is an object of the present invention to provide an improved separator construction for a portable record card filing tray having projecting thumb knob means at the upper edges of the separators with adjacent cut-out portions above which the top edges of the record cards extend for grasping the same to remove them from the tray and for locating guide or index tabs, the projecting thumb knob means protecting the upper edges of the record cards and the index tabs from damage.

Also, it is an object of the present invention to provide an improved portable record card filing tray having a smooth tray base top on which the lower edges of the record cards ride so as to prevent damage to the lower edges of the record cards.

Furthermore, it is an object of the present invention to provide a new portable record card filing tray with a base and having a plurality of separators with an improved separator construction and improved means for mounting and retaining the separators in the tray.

Finally, it is an object of the present invention to provide a new portable record card filing appliance which is durable and effective in use, which has an improved and simplified construction and arrangement that may be readily manufactured and assembled by the simplest of operations in an inexpensive manner, which overcomes the foregoing prior art difficulties and solves many problems existing in the art, and which incorporates one or more or all of the foregoing advantages and desiderata.

These and other objects and advantages apparent to those skilled in the art from the following description and claims may be obtained, the stated results achieved, and the described difficulties overcome by the devices, arrangements, elements, parts, constructions, combinations, sub-combinations, filing appliances, and tray structures which comprise the present invention, the nature of which is set forth in the following general statement, a preferred embodiment of which—illustrative of the best mode in which applicants have contemplated applying the principles—is set forth in the following description, and which are particularly and distinctly pointed out and set forth in the appended claims forming part hereof.

The nature of the improvements in filing appliances may be stated in general terms as including a tray member having a base provided with a smooth flat top formed with stop means at each end thereof and an open side, a side wall projecting upward from the flat top of the base at the side opposite said open side, a plurality of upstanding separator members removably pivotally mounted on the base, means at the top and bottom edges of the separator members uniformly spacing the same to provide a series of compartments therebetween of equal and uniform thickness throughout, an upstanding end member pivotally mounted at each end of the base adjacent said base stops on axes lying in the plane of the axes of rotation of the separator members, preferably combined handle and reinforcing means at the lower portion of each end member, said end members and the separators therebetween being adapted to rock individually or in groups on their axes until one of said end members is stopped by one of said base stops to form a V-shaped opening between certain adjacent separators for rendering record cards filed between adjacent separator members visible and accessible, positive lock means for locking said separator members to the tray member, and manually operated means for disengaging said lock means to permit removal of any one or more of said separator members without disturbing the remaining separator members.

By way of example, a preferred embodiment of the improved filing appliance is illustrated in the accompanying drawings forming part hereof wherein:

Figure 1 is a side elevation of a filing appliance incorporating the improvements of the present invention;

Fig. 2 is a front elevation of the filing appliance shown in Fig. 1;

Fig. 8 is a front elevation of one of the tray end members;

Fig. 9 is a side elevation of the end member shown in Fig. 8;

Fig. 10 is a front view of one of the improved separators with one pivot roller member assembled thereto;

Fig. 11 is an enlarged section through one of the separator pivot roller members taken on the line 11—11, Fig. 10;

Fig. 12 is an enlarged fragmentary view illustrating one of the improved separator pivot roller members secured to a separator;

Fig. 13 is an enlarged perspective view of one element of the improved separator pivot roller member;

Fig. 14 is an enlarged perspective view of another element of the improved separator pivot roller member;

Fig. 15 is an enlarged fragmentary front view of an upper corner of one of the separator members showing an improved thumb knob construction;

Fig. 16 is a top plan view of the construction shown in Fig. 15;

Fig. 17 is a section taken on the line 17—17, Fig. 15;

Fig. 18 is a view similar to Fig. 17 illustrating the means of attaching thumb knobs to the end members taken on the line 18—18, Fig. 2;

Fig. 19 is a fragmentary plan sectional view of one corner of the tray base illustrating the latch for operating the lock in locking position, taken on the line 19—19, Figs. 22 and 23;

Fig. 20 is a view similar to Fig. 19 but showing the latch in unlocked position and the lock locked;

Fig. 21 is a view similar to Figs. 19 and 20 but showing the latch and lock both unlocked;

Fig. 23 is a fragmentary section looking in the direction of the arrows 23—23, Fig. 19;

Fig. 24 is a fragmentary section looking in the direction of the arrows 24—24, Fig. 20;

Fig. 25 is a fragmentary section looking in the direction of the arrows 25—25, Fig. 21;

Fig. 26 is a fragmentary section looking in the direction of the arrows 26—26, Fig. 19;

Fig. 27 is a fragmentary section looking in the direction of the arrows 27—27, Fig. 28; and Fig. 28 is a plan sectional view of the tray base illustrating the end member mounting, taken on the line 28—28, Fig. 3.

Similar numerals refer to similar parts throughout the various figures of the drawings.

The improved filing appliance is described in detail herein with particular reference to the handling of machine posted records in connection with the operation of bookkeeping or billing machines and the like. However, the improvements of the present invention are not limited to use in a filing appliance handling machine posted records because any type of record card may be handled or filed in the improved filing appliance.

The term "record card" as used herein is intended to include, and without limitation, any type of card, sheet or form of almost any thickness from light weight bond or ledger paper to heavy index bristol board and cardboard, on which records are printed, typed, photographed or otherwise entered and including photographic negatives and prints and sound recording records.

The improved filing appliance is generally indicated at 1 and may be generally characterized as a tray having a base member generally indicated at 2, separator members generally indicated at 3, and end support members generally indicated at 4. Although the base member 2 may be constructed of wood, in accordance with the present invention, it is preferably formed of sheet metal for strength, lightness and compactness. The separator members 3 may be formed of any suitable stiff material, preferably stiff fiber board and the like. The end support members 4 are preferably formed of sheet metal to provide the necessary strength.

Figure 3:
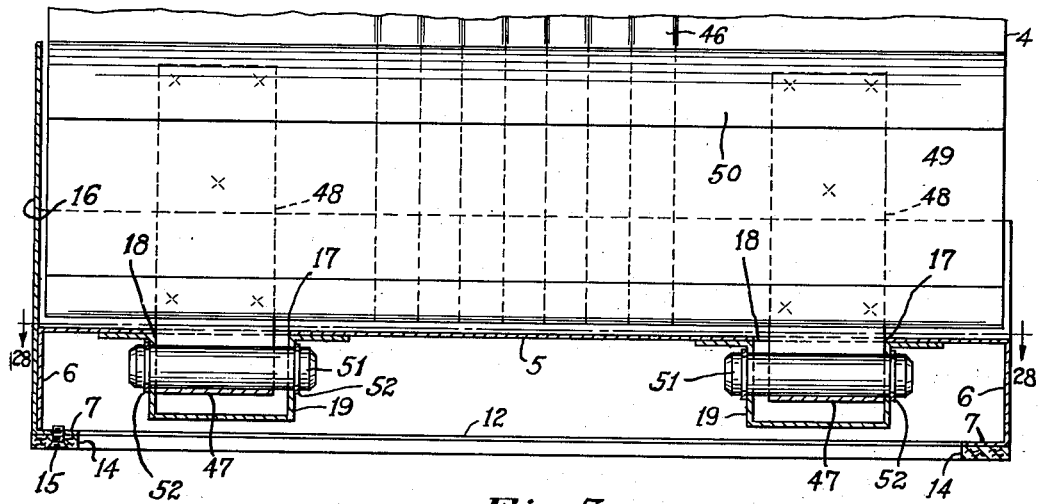
Fig. 3 is a fragmentary sectional view looking in the direction of the arrows 3—3, Fig. 1, but omitting lock details.
Figure 6:
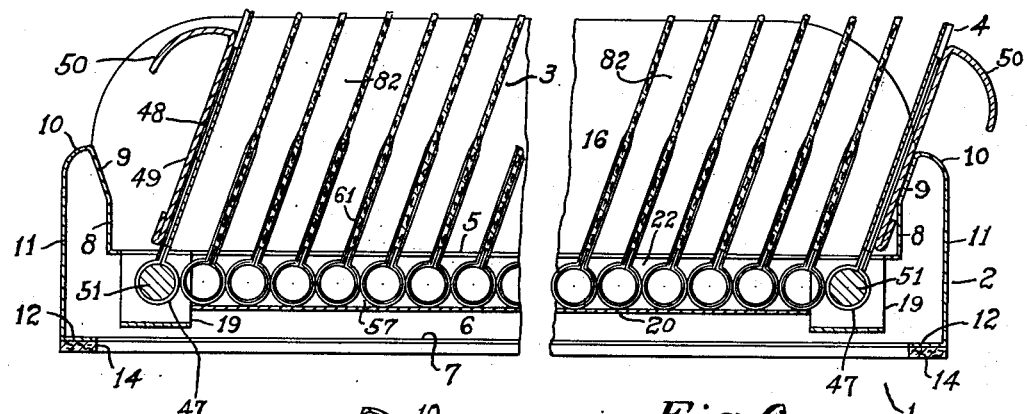
Fig. 6 is an enlarged fragmentary longitudinal section through the improved filing tray looking in the direction of the arrows 6—6, Fig. 2.

Referring particularly to Figs. 3, 6 and 28, the base member 2 has a flat smooth sheet metal top wall 5 terminating at its side edges in downturned flanges 6 which are in turn formed with inturned base flanges 7. At each end, the top wall 5 (Fig. 6) is formed with an upstanding wall 8, an angled stop wall 9, a curved trim wall 10, and a downturned end wall 11 terminating in an inturned bottom flange 12 meeting inturned flanges 7 at mitered corners 13. The flanges 7 and 12 are preferably faced with some material which readily slides on smooth finished desk tops and the like without scratcing or marring the finish thereof, such as fiber strips 14 which may be secured to the flanges 7 and 12 as by screws 15.

The base 2 is provided with an upstanding aligning side wall flange 16 extending above the plane of the top wall 5 preferably at the left hand side of the tray, for a purpose to be later described. The base top wall 5 is also formed with two elongated slots 17 (Figs. 3, 4 and 28), spaced inwardly from and parallel to the side edges of the base member 2, and each slot 17 is widened at 18 at each end of the slot 17 adjacent each end wall of the base.

A channel bracket 19 is secured to the underside of the top wall 5, as by spot welding, below each enlarged end portion 18 of each slot 17. A channel strip 20 is also secured, as by spot welding, to the underside of the top wall 5 below one of the elongated slots 17 extending between the channel brackets 19 at either end thereof; the channel strip 20 preferably being located below the lefthand slot 17 (Figs. 4 and 28).

Figure 4:
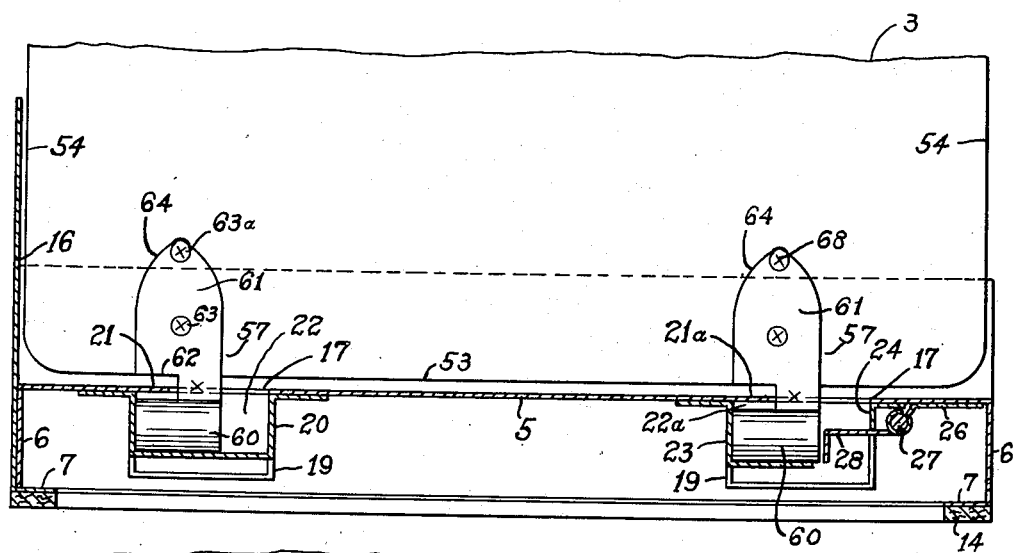
Fig 4 is a fragmentary sectional view similar to Fig. 3 looking in the direction of the arrows 4—4, Fig. 1, and showing the separator means locked to the filing tray base with the locking means in locked position.

As shown in Fig. 4, the channel strip 20 is shallower than the channel brackets 19 at the ends thereof; but the channel recesses in the members 19 and 20 preferably have the same width so that a longitudinally extending striplike portion 21 of the top wall 5 overhangs the channel recess 22 formed by the channel strip 20, above the lefthand portion of the recess 22.

Figure 5:
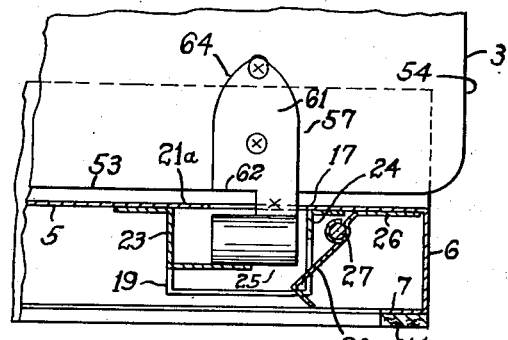
Fig. 5 is a fragmentary view similar to a portion of Fig. 4 but showing the locking means in unlocked position and a separator about to be removed from or just inserted in the tray base.

Referring particularly to Figs. 4, 5 and 28, a Z-strip 23 is secured, as by spot welding, to the underside of the top wall 5 below and spaced from a lefthand edge of the righthand slot 17 so as to form an overhanging top wall portion 21a above the recess 22a formed by the Z-strip 23. The vertical web portion of the Z-strip 23 is preferably aligned with the lefthand vertical channel portions of the channel brackets 19 (Fig. 4), and the lower Z-flange of the Z-strip 23 is located in the same plane as the plane of the web of the channel strip 20, spaced above the plane of the channel web of righthand channel brackets 19 (Fig. 4).

Likewise, an angle strip 24 is secured, as by spot welding, to the underside of the top wall 5 with its downturned flange extending downward (Fig. 4) from the righthand edge of righthand slot 17 to complete the formation of recess 22a below righthand slot 17. Accordingly, recesses 22 and 22a have the same shape and extent excepting that the channel walls forming the recess 22a are cut out at and adjacent the lower righthand corner thereof, as indicated generally by the numeral 25 in Fig. 5.

A hinge strip strap member 26 is preferably spot welded to the underside of the top wall 5 between angle strip 24 and the righthand base wall 6 of the base 2, as shown in Fig. 4; and the member 26 carries a hinge pin rod 27 to which an angle strip member 28 is pivoted for movement between the positions shown in Figs. 4 and 5. The angle strip 28 extends throughout the length of the narrow portion of righthand slot 17 and forms a longitudinally extending stop member projecting into recess 22a through cut out corner portion 25 when the stop member is in the position shown in Fig. 4. When in this position, upward or clockwise movement of angle strip 28 is prevented by angle strip 24. Movement of angle strip 28 in a counter-clockwise direction beyond the position shown in Fig. 5, is controlled by stop means to be later described in connection with Figs. 21 and 25.

A latch, lock and control mechanism for the stop angle strip 28 is mounted in the base member 2 preferably in the region of the right front corner thereof. This control mechanism is best shown in Figs. 19 through 28 and includes a latch member 29 having a stop control member 30 preferably having an upper rounded extremity 31 (Figs. 23 and 25). The control member 30 projects to one side of the rear end of connector member 32 which extends forwardly and upwardly at 33 and is formed at its front upper end with a mounting bar portion 34 which terminates in an inturned flange 35.

Figure 22:
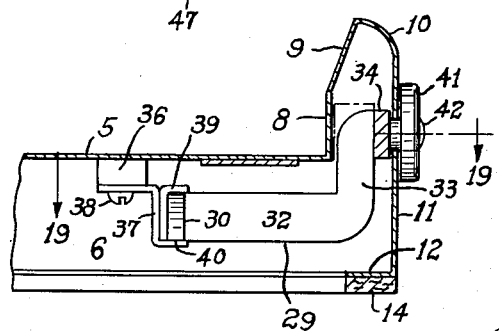
Fig. 22 is a fragmentary section looking in the direction of the arrows 22—22, Fig. 20.

A bolster 36 is preferably spot welded to the underside of top base wall 5 as shown in Fig. 22, and a Z-bracket 37 is secured thereto by screws 38. An angle bracket 39 is preferably spot welded to Z-bracket 37, forming a slide channel 40 along which control member 30 slides from the position illustrated in Figs. 19 and 23 to the position indicated in Figs. 21 and 25. The mounting bar portion 34 has a thumb operating button 41 attached thereto by screw 42, the button being located adjacent the right front corner of the front downturned end wall 11 of the tray and operating along slot 43 formed in said wall 11.

Referring to Fig. 28, movement of the latch member 29 is also controlled by spring 44, one end of which is attached to flange 35 of the latch member 29 and the other end of which is attached to a clip 45 secured to the inside of the front end wall 11 of the tray. Thus, the spring 44 normally urges the latch member 29 to the position illustrated in Figs. 19 and 23 but the latch member 29 may be moved to the position shown in Figs. 20, 21, 24 and 25 by operation of the thumb button 41 toward the right.

Referring to Fig. 23, when the latch member 29 is in normal position there shown, its control member 30 positively locks the angle strip 28 in a stop position wherein it occupies and restricts a corner portion of the recess 22a. In this position, the end of control member 30 engages the downturned flange of angle strip 28 and the top edge of control member 30 engages under the horizontal portion of angle strip 28.

When the thumb button 41 is moved to the right, control member 30 of latch 29 moves to the position shown in Figs. 20 and 24 thereby releasing its engagement with angle strip 28 and permitting angle strip 28 to pivot counter-clockwise to the position shown in Figs. 5, 21 and 25 until it engages the rounded end portion 31 when further counter-clockwise rotation of angle strip 28 is prevented. In this latter position, as previously described, the angle strip 28 does not project into or restrict free movement within base recess 22a.

When thumb button 41 is released, spring 44 pulls latch member 29 back to the position shown in Fig. 23 from that shown in Fig. 25, and rounded end 31 of control member 30 rides over and engages angle strip 28 to move it to the position shown in Fig. 23 when it again occupies space within and restricts recess 22a.

Referring to Figs. 1, 2, 3, 6, 8 and 9, the end support members 4 are each preferably formed of sheet metal for stiffness and strength and are provided with vertical reinforcing corrugations 46. Spaced hinge pivots 47 project from the bottom edge of end support members 4 and may be secured thereto by spot welding the strap portions 48 to the members 4. A cross brace reinforcing member 49 terminating in a curved handle portion 50 may also be secured to the outside face of the lower end of each support member 4 as by spot welding.

The end support members 4 are pivotally mounted on the base 2 by inserting pivot cylinders 47 into the enlargements 18 at the ends of slots 17 within the recesses formed by channel brackets 19 and by mounting pivot cylinders 47 on pivot pins 51 journaled in the channel flanges of channel brackets 19 and fixed thereto by snap rings 52. Referring to Fig. 28, the outer edges of pivot cylinders 47 are located closely adjacent the outside channel flanges of channel brackets 19 to prevent sidewise movement in either direction of the support members 4.

Figure 7:
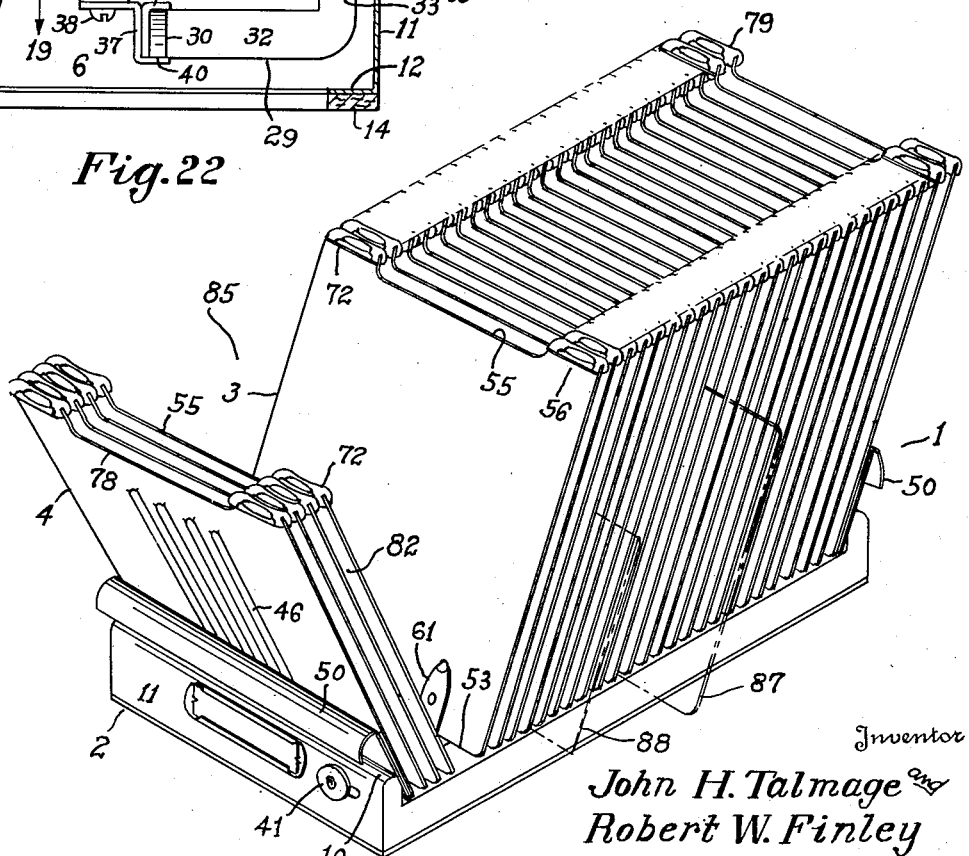
Fig. 7 is a perspective view of the improved filing appliance shown in Fig. 1.

Forward pivotal movement of front end support 4 is limited by engagement of cross brace 49 with angled stop wall 9 at the front end of base 2 as illustrated in Fig. 7; and rearward pivotal movement of rear end support 4 is limited by engagement of cross brace 49 with angled stop wall 9 at the rear end of base 2 as illustrated in Figs. 6 and 7.

Referring to Figs. 6 and 10 through 14, the separator members 3 are each preferably formed of some thin stiff material such as fiber board to have a lower edge 53, side edges 54 and a recessed top edge 55 having upwardly projecting tab portions 56. Each separator member 3 has two hinge roller members generally indicated at 57 secured to its lower portion. Each roller member 57 is preferably formed of two elements 58 (Fig. 13) and 59 (Fig. 14). The element 58 has a cylindrical portion 60 terminating in two strap portions 61 formed with notches or recesses 62; and each strap portion 61 is formed with inwardly depressed buttons 63 and 63a. The upper end of each strip portion 61 is curved or arch-shaped as indicated at 64.

The element 59 is formed with a cylindrical portion 65 and projecting ears 66 and the element 59 is telescoped within element 58 so that cylinder 65 is within and reinforces cylinder 60 and so that ears 66 lie between straps 61 adjacent cut-out notches 62.

In assembling the roller members 57 to separator members 3, spaced holes (Fig. 10) 67 are formed in the separators 3 spaced apart a distance equal to the space between buttons 63 and 63a and having a slightly larger diameter than the diameter of the projecting portions of buttons 63 and 63a as best seen in Fig. 11. The strap portions 61 are then engaged over the faces of separator member 3 with the projecting buttons 63 and 63a entering holes 67 and the adjacent faces of the buttons are contacted and spot welded together as indicated at 68, thus securely and rigidly clamping the roller members to the separator 3. At the same time, spot weld 69 may be formed between overlying strap members 61 and underlying ears 66.

It is important that the roller members 57 on the bottoms of the separators 3 be rigid and stiff and yet the metal thickness of the strap portions should be very thin so as to avoid reducing the effective or useful space between adjacent separators. Accordingly, with the particular construction, very light gauge sheet metal may be used for forming elements 58 and 59, yet the cylindrical portions 60—65 are heavy and reinforced so as to maintain a truly cylindrical roller shape; and four thicknesses of metal are provided adjacent the cut-out notches 62 which are necessary for a purpose to be described.

Furthermore, by forming the arch-shaped upper ends 64 on the strap members which die out at the upper buttons 63a whose locations are inward of the outer surfaces of strap members 61, there is no sheet metal edge at the top of roller members 57 upon which record cards will catch as they are slipped downward along either surface of any separator member 3.

The top edge of the sheet metal strap members 61 is located within the upper button receiving hole 67, as indicated at 70 in Figs. 11 and 12 so that any record card sliding downward along either surface of separator member 3 slides along angled edge 71 (Fig. 11) on either side of separator member 3. Accordingly, the particular sheet metal hinge construction for fiber board separators provides for rigidity, strength and stiffness and yet the sheet metal strap portions do not project beyond the faces of the separator members 3 in such a manner as to provide a shoulder upon which record cards slipped downward between separator members can catch.

In Fig. 10, only one roller member 57 is illustrated attached to the separator member 3 in order that the attaching holes 67 may be shown, but it is understood that another roller member 57 will be attached to separator member 3 by holes 67 shown in the lower lefthand corner. The particular roller construction, in addition to the advantages just described, is very simplified and avoids the use of rivets and the like for attaching a sheet metal member to a fiber board member.

Referring to Figs. 10, 15, 16 and 17, an improved thumb knob 72 is secured to each projecting ear 56 at the top of each separator member 3. The thumb knob 72 may be formed of any suitable material, preferably molded plastic, with a groove 73 in its lower edge embracing the ear 56 of separator member 3. The thumb knob 72 preferably has rounded top corners 74 and rounded edge corners 75 with flat faces 76 formed with angled thumb recesses 77. The thumb knobs 72 are preferably secured to the separator members 3 by cementing the engaged surfaces in grooves 73.

Referring to Figs. 8 and 18, each end support 4 is provided with a cut-out upper edge 78 similar in location and contour to the cut-out upper edge 55 of each separator member 3; and thumb knobs 79 are secured to upstanding ears 80 on each end support 4. The thumb knobs 79 are preferably formed to have the same shape as the thumb knobs 72 but because the end members are formed of sheet metal rather than fiber board, the thumb knob 79 cannot be readily cemented to the support member ears 80 and therefore drive rivets or screws 81 (Fig. 18) are used to assemble thumb knobs 79 to end support members 4.

Referring particularly to Figs. 4, 5, and 6, separator members 3 may be assembled to the tray base 2 by inserting rollers 57 straight downward as shown in Fig. 5 through the narrow slots 17 in the top wall 5 of the base 3 when the angle strip 28 is in the position illustrated in Fig. 5. Separators 3 may then be moved to the left when overhanging base walls 21 and 21a engage in notches 62 of the separator rollers 57 (Fig. 4) so as to secure the separators 3 against upward withdrawal from the base member. When the separators are so moved, they are aligned with the end support members 4; and latch member 29 by movement of spring 44 moves angle strip 28 to the position shown in Fig. 4 securely and positively locking the separator members 3 to the base member 2.

A full complement of separator members 3 is mounted on the base member as illustrated in Figs. 1, 6 and 7 and when they are so mounted, the pivot axes of the end support members 4 and separator members 3 all lie in the same horizontal plane as shown in Fig. 6, which axes plane is located closely adjacent the smooth top surface of base top wall 5.

The diameters of separator rollers 57 and of end support hinge pivots 47 are equal and uniform and are also substantially equal to the thickness between the flat faces 76 of knobs 72 and 79 so as to provide a series of compartments 82 of equal size and uniform spacing throughout, between adjacent separator members or adjacent separator and end support members as shown in Figs. 1 and 6.

A series of record cards 83 may be housed in any or all compartments 82, as illustrated, with the bottom edges of the record cards 83 resting on the smooth flat top surface of the top base wall 5. The cut-out portions 55 and 78 in the top edges of the end support members 4 and separators 3 are located a slight distance below the top edges of the record cards 83 as shown in Fig. 2 so that record cards may be readily grasped between thumb and fingers for removal from the tray. Likewise, the record cards 83 may be indexed or guided by cards similar in size and shape to the record cards 83 but having projecting index tabs 84 as shown in Fig. 2, When it is desired to inspect or remove any particular record card or groups of record cards, assuming that all of the separator and end members are angled to the right in the position of the righthand group in Figs. 1 and 7, the operator may quickly inspect the index or guide tabs 84 for quickly ascertaining the general location of the particular record card desired, and a thumb or finger may then be inserted in thumb grooves 77 of adjacent thumb knobs 72 and the forward group of separators and end members is pulled forwardly thereby to the position shown by the lefthand block in Figs. 1 and 7 thereby forming a wide V-opening 85 at the general location of the particular record card desired. The particular record card may then be quickly located by riffling or blading the cards and when located, its entire front surface is readily visible to the operator because of the large V-opening.

If, for any reason, it is desired to temporarily segregate particular record cards from the remainder filed in the improved tray 1, they may be offset as shown in dot-dash lines at 86 in Fig. 2. When the purpose of offsetting has been satisfied, the right edges of the offset cards may be tapped or patted by the operator's hand to press them to the left (Fig. 2) when all the cards will be engaged and aligned by the upstanding flange 16 at the left side of the tray.

Another manner in which certain record cards may be segregated and distinguished from other cards in the filing appliance is to turn the cards on their side edges so as to project outwardly to the right as indicated in dot-dash lines at 87 in Fig. 7: and similarly material may be stuffed temporarily between record cards as indicated in dot-dash lines at 88 in Fig. 7.

Referring to Fig. 1, the arc through which any separator or end member swings in moving from a rearwardly to a forwardly angled position is indicated in dot-dash lines at 89 with reference to the rear end support member 4.

In some instances where it is not desired to provide for offsetting record cards, an upstanding flange may be provided at the right side of the tray similar to the upstanding flange 16 at the left side of the tray, and the separators and end support members 3 and 4 will have a width somewhat less than the distance between said upstanding flanges as shown in the Bockius and Erickson Filing Appliance application Serial No. 622,297 filed October 15, 1945, now Patent Number 2,574,523 granted November 13, 1951.

Moreover, in some instances, it may be desired to provide only one thumb knob on each separator and end member and when this is done, as shown in the Bockius and Erickson Serial No. 622,297, it may be provided on a centrally disposed ear. Furthermore, when desired, sight holes may be formed in all separator and end support members as shown in said application Serial No. 622,297.

The improved filing appliance saves considerable time and speeds work in handling machine posted records because of its compactness, convenience and flexibility. Because of the elimination of compressors, angle plates, followers, pins and the like, there is no waste space, resulting in greater record card capacity. A business machine operator may begin posting record cards filed in the tray immediately and when finishing, the tray is closed without any "before" and "after" operations.

The improved filing appliance construction provides split-second location of any record and with faster finding because of the easier accessibility to more records and of the smooth, effortless operation of the roller bearing pivoted separators, the operator has more records available ready to post in less time and with fewer operations than in prior art constructions.

The guiding or indexing is completely independent of the separators which is an aid in using the improved filing appliance, and the top edges of all records are accessible above the cutout portions in the end supports and separators so as to permit rapid riffling of the record cards and segregation of any particular card or group of cards.

The wide opening V-space 85, which is automatically formed as the separators are tilted forward, remains open until it is intentionally closed so that visibility and accessibility for reference to or removal of any record card is complete. The record cards stand naturally on the smooth top wall 5 of the tray base 2 and even though these bottom edges may slide slightly along the smooth flat top 5 of the tray base 2, there is no damage nor appreciable wear to the bottom edges of the cards. These edges, being the "machine-feed" edges are therefore always protected.

The appliance is easily operated regardless of whether the filing sections formed by the multiple separators are filled to capacity or are completely empty; and the filing sections provide ample stuffing space when desired.

Whole sections of records may be removed for checking elsewhere without causing the remaining records to collapse; and the filing space for the records removed is always maintained, thus assuring correct refiling.

The particular design of thumb knobs at the top of the multiple separators not only permits instant access to any filing space but provides uniform spacing from top to bottom to hold the records neatly and compactly in an upright position. The knobs, in conjunction with the roller cylinders at the bottom of the separators, produce effortless operation so that sections of cards can be swung back or forth with ease. Because of the effortless operation and elimination of waste motions, there is less fatigue to the operator.

Normally, any tray is filled with records in all spaces 82 excepting a few unfilled spaces at the rear of the tray. When there is any occasion to expand the filing space in any particular section to accommodate an increased number of record cards, one of the separators may be quickly moved from a rear location to another location in the tray by a slight movement of control button 41 which releases the locking angle bar 28, permitting the separator to be shifted to the right to unlocked position and removed and then inserted at the desired location where expansion is needed. Thus, record sections may be expanded or contracted with ease and without disturbing any of the records filed in the tray.

The multiple separator construction prevents buckling or curling of the records even though the record cards are formed from light weight bond or ledger paper; and the accessibility of the top edges of the record cards which permits rapid riffling or blading eliminates the formation of "dog-ears."

The improved construction likewise facilitates efficient manufacture of the trays for accommodating almost any size of record say from 5" to 17" wide and 3" to 14" high. A few stock sizes of bases may be made varying in width by steps of from 1″ to 2″. Each width of tray will accommodate any height of record card and the separators, guides and record cards are all formed to the same size and may be assembled with a base. Any standard base width will accommodate a change in width of separators, cards and guides within the limits for which a standard base is designed simply by shortening or lengthening the width of the record cards, separators, etc. at the righthand edges thereof.

It has been indicated that the diameters of the separator rollers and end support hinge pivots are substantially equal to the thickness between the flat faces of the ears 72 and 79 so as to provide a series of uniform compartments. However, the pivot rollers on the separators and end members are slightly larger in diameter than the thickness of the thumb knobs because the hinge straps 61 of separator rollers 57 extend into compartments 82 and slightly diminish the width of the lower portions of the compartments. Thus, by making the roller diameters slightly larger, the space between strap portions of adjacent separator members may be made equal to the space between the separator members at their top ends. However, this is only a slight variation in thickness, equal to twice the thickness of the sheet metal of any strap portion, so that when the term "substantially equal" is used herein and in the claims, it is intended to include such variations in order to produce compartments 82 as wide at their bottom portions as at their top portions.

Furthermore, with reference to the thumb knobs 72 and 79, by forming the same of plastic material, they can be made of different colors for signaling purposes or for indicating different groups of record cards filed in the improved appliance. Also, when it may be desired to provide for instantly offsetting all record cards in the appliance, the lefthand edges of the separator members and end members may be notched intermediate their upper and lower edges so that pressure against the record cards at the notches along the lefthand side of the appliance will move all record cards to the right to offset position.

Accordingly, the present improved construction provides an improved smooth base with one high side for aligning records while protecting the machine-feed edges thereof; provides an improved positive manually controlled lock for locking the separators to the base but permitting ready removal thereof; provides a self-contained locking mechanism; provides an improved end support member construction, which is stiff, strong, braced, and includes lifting handles and forms with the base stop means, the full access V-opening; provides means for retaining the end covers pivoted on axes located in the same plane as the axes of multiple separator rollers; provides means for attaching the rollers to the multiple separators and for reinforcing the rollers to hold a truly round bearing shape; provides an improved thumb knob construction for the multiple separators; provides an improved cut-out for the top edges of the multiple separators permitting ready access to and gripping, riffling or blading of the record cards; provides projecting thumb knobs which protect the upper edges of the record cards and guides from damage; and generally provides an improved and simplified construction overcoming difficulties with prior art structures and attaining the new results described.

The embodiment of the present improvements illustrated and described herein is by way of example, and the scope of the present invention is not limited to the exact details of construction of the various parts.

Finally, in the foregoing description, certain terms have been used for brevity, clearness and understanding; but no unnecessary limitations are to be implied therefrom beyond the requirements of the prior art, because such words are used for descriptive purposes herein and not for the purpose of limitation, and are intended to be broadly construed.

Having now described the features of the invention, the construction, operation and use of preferred embodiments thereof, and the advantageous, new and useful results obtained by the improved filing appliance; the new and useful devices, arrangements, elements, parts, constructions, combinations, sub-combinations, and filing appliances, and reasonable mechanical equivalents thereof, obvious to those skilled in the art, are set forth in the appended claims.

We claim:

1. In a filing tray appliance, a base having a smooth flat top, stop members projecting upward from each end of said top, a flange projecting upward from one side of said top and extending between said stop members, an end support member pivotally mounted on the base adjacent each stop member, a plurality of separator members removably pivotally mounted on the base between said end support members, the pivot axes of said end and separator members lying in a plane below the plane of said top, said end and separator members being adapted to rock individually and in groups on their axes until one of said end members abuts one of said stop members to form a V-opening between certain adjacent separator members, said base and end support members being formed of sheet metal, and a combined handle and reinforcing member at the lower portion of each end member engageable with the adjacent stop member.

2. In a filing tray appliance, a sheet metal base having a flat smooth top wall, a plurality of separator members removably pivotally mounted on the base below said top wall, a sheet metal end support member pivotally mounted on the base below said top wall on an axis lying in the plane of the pivot axes of said separator members, a stop member projecting upward from each end of said top wall provided with an angular wall portion, and a reinforcing metal strip having a handle portion and extending laterally of the lower portion of each end member engageable with the angular wall portion of the adjacent stop member for limiting pivotal movement of the end support members.

3. In a filing tray appliance, a hollow base formed with a smooth flat top wall, a slot formed in the base spaced from and parallel to each side edge of the base, a channel member secured to the underside of the top wall below one slot and having a width greater than the width of said slot to form a channel recess having an overhanging top wall portion, a Z-shaped strip member secured to the underside of the top wall below the other slot to form a second recess having an overhanging top wall portion, a stop member pivotally mounted within the hollow base and movable between positions obstructing and free of said second recess, means for locking said stop member in recess obstructing position, means for releasing said stop member to permit it to move to recess-free position, a plurality of separator members having notched rollers at their lower edges, said rollers being entered into the channel recesses through said slots and located in positions in which the overhanging top wall portions engage the roller notches, and said stop means when in recess obstructing position preventing movement of the rollers to disengage the notches from the overhanging walls.

JOHN H. TALMAGE.
ROBERT W. FINLEY.

REFERENCES CITED

The following references are of record in the file of this patent:

UNITED STATES PATENTS

| Number | Name | Date |
|---|---|---|
| 1,013,633 | Yawman | Jan. 2, 1912 |
| 1,752,300 | Hutchings | Apr. 1, 1930 |
| 1,811,633 | Hutchings | June 23, 1931 |
| 1,821,245 | Straubel | Sept. 1, 1931 |
| 2,015,460 | Rand et al. | Sept. 24, 1935 |
| 2,156,955 | Page | May 2, 1939 |
| 2,359,376 | Martin | Oct. 2, 1944 |
| 2,422,935 | Straubel et al. | June 24, 1947 |
| 2,459,385 | Martin | Jan. 18, 1949 |